United States Patent
Saenger Nayver et al.

(10) Patent No.: US 11,794,652 B2
(45) Date of Patent: Oct. 24, 2023

(54) MULTI-REGION ELECTRO-OPTIC ELEMENT

(71) Applicant: GENTEX CORPORATION, Zeeland, MI (US)

(72) Inventors: Mario F. Saenger Nayver, Holland, MI (US); George A. Neuman, Holland, MI (US); John S. Anderson, Holland, MI (US); Yuping Lin, Zeeland, MI (US); Eric A. Gobrogge, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 352 days.

(21) Appl. No.: 17/232,582

(22) Filed: Apr. 16, 2021

(65) Prior Publication Data
US 2021/0323476 A1 Oct. 21, 2021

Related U.S. Application Data

(60) Provisional application No. 63/011,535, filed on Apr. 17, 2020.

(51) Int. Cl.
*G02F 1/015* (2006.01)
*B60R 1/08* (2006.01)
(Continued)

(52) U.S. Cl.
CPC .............. *B60R 1/088* (2013.01); *B60R 1/12* (2013.01); *G02F 1/0154* (2021.01); *G06V 40/18* (2022.01); *B60R 2001/1253* (2013.01)

(58) Field of Classification Search
CPC ...... G02F 1/163; G02F 1/1514; G02F 1/0154; G06V 40/18; B60R 2001/1253; B60R 1/12; B60R 1/088
See application file for complete search history.

(56) References Cited

U.S. PATENT DOCUMENTS 5,581,380 A 12/1996 Bergman
2014/0036337 A1* 2/2014 Neuman ............... G02F 1/1533
359/265

(Continued)

FOREIGN PATENT DOCUMENTS

EP 2426552 A1 3/2012
KR 950704714 A 11/1995

OTHER PUBLICATIONS

International Search Report dated Jul. 15, 2021, for corresponding PCT application No. PCT/US2021/027653, 2 pages.
(Continued)

*Primary Examiner* — Christopher Stanford
*Assistant Examiner* — Journey F Sumlar
(74) *Attorney, Agent, or Firm* — Price Heneveld LLP; Brian James Brewer

(57) ABSTRACT

An electro-optic element having multiple regions is disclosed. The electro-optic element comprises an electro-optic medium disposed between two electrodes. Further, the electro-optic medium is operable between activated and un-activated states based, at least in part, on exposure to an electrical potential. In some embodiments, in response to an electrical potential of a first polarity, the electro-optic medium may be substantially activated in one region and substantially un-activated in another region. In response to an electrical potential of a second polarity opposite the first polarity, the electro-optic medium may be substantially activated in both regions. In other embodiments, the electro-optic medium is operably activated such that electro-optic medium is activated in one region and un-activated in another region, regardless of polarity.

20 Claims, 8 Drawing Sheets

(51) Int. Cl.
*B60R 1/12* (2006.01)
*G06V 40/18* (2022.01)

(56) References Cited

U.S. PATENT DOCUMENTS

| | | | | |
|---|---|---|---|---|
| 2015/0329054 | A1* | 11/2015 | Neuman | G02F 1/161 |
| | | | | 359/267 |
| 2016/0139477 | A1* | 5/2016 | Jack | G09G 3/19 |
| | | | | 359/275 |
| 2016/0202588 | A1 | 7/2016 | Bass et al. | |
| 2016/0243987 | A1* | 8/2016 | Kendall | B60R 1/04 |
| 2018/0105114 | A1* | 4/2018 | Geerlings | G02F 1/157 |
| 2019/0018242 | A1 | 1/2019 | Saenger Nayver et al. | |
| 2019/0163013 | A1* | 5/2019 | Cammenga | B60R 1/12 |
| 2020/0307458 | A1* | 10/2020 | Chiodo | H04N 23/60 |

OTHER PUBLICATIONS

Written Opinion dated Jul. 15, 2021, for corresponding PCT application No. PCT/US2021/027653, 4 pages.
Extended European Search Report dated Aug. 31, 2023, for corresponding European application No. 201789053.2, 8 pages.

* cited by examiner

MULTI-REGION ELECTRO-OPTIC ELEMENT

CROSS-REFERENCE TO RELATED APPLICATIONS

This application claims priority under 35 U.S.C. § 119(e) to U.S. Provisional Application No. 63/011,535 filed on Apr. 17, 2020, entitled "MULTI-REGION ELECTRO-OPTIC ELEMENT," the disclosure of which is hereby incorporated by reference in its entirety.

FIELD OF INVENTION

The present invention relates in general to electro-optic elements, and more particularly to electro-optic elements having multiple regions.

BACKGROUND OF INVENTION

Electro-optic elements have been well known for quite some time and are becoming increasingly common in rearview assemblies and windows. However, while these electro-optic elements have proved useful, they are not perfect. For example, current electro-optic elements typically have a single uniform region of variable transmittance. Accordingly, electro-optic elements having a single region may reduce the performance of sensors disposed there behind by reducing the amount of light available to the sensor, particularly when the electro-optic element is in an activated state.

Additionally, some devices may have multiple electro-optic elements. These electro-optic elements may be disposed adjacent one another to provide for multiple regions. However, these electro-optic elements must be separated by seals or other barriers in order to operate each region independently. These seals and barriers, however, create aesthetically un-pleasing appearances. Accordingly, there is a need for improved electro-optic elements.

SUMMARY

In accordance with the present disclosure, the disadvantages and problems associated with electro-optic elements only having single, uniform regions without the use of seals or other barriers have been substantially reduced or eliminated.

According to one aspect of the present disclosure, an apparatus is disclosed. The apparatus may comprise an electro-optic element. The electro-optic element may have a first region and a second region. Further, the electro-optic element may comprise a first substate, a second substate, a first electrode, a second electrode, and an electro-optic medium. The first substrate may have a first surface and a second surface. Similarly, the second substrate may have a third surface and a fourth surface. Further, the second substrate may be disposed in a spaced apart relationship with the first substrate. The first electrode may be associated with the second surface. Similarly, the second electrode may be associated with the third surface. The electro-optic medium may be disposed between the first electrode and the second electrode. Additionally, the electro-optic medium may be operable between substantially activated and substantially un-activated states based, at least in part, on to exposure to an electrical potential. In some embodiments, the electro-optic medium may be substantially activated in the first region and substantially un-activated in the second region when the electrical potential between the first and second electrodes is of a first magnitude and a first polarity. Conversely, the electro-optic medium may be substantially activated in the first region and in the second region when the electrical potential is of the first magnitude and a second polarity. The second polarity may be opposite the first polarity. In some embodiments, the first and second regions of each of the first and second electrodes may each be continuous and uninterrupted between each other. Accordingly, the first and second regions for each of the first and second electrodes are each in electrical communication with each other.

In some embodiments, the first and/or second electrode may have different oxidation states in the first and the second regions. Similarly, the first and/or second electrode may comprise different metal oxides in the first and the second regions.

In some embodiments, the first and/or second electrode may be surface modified within one of the first and second regions. In some such embodiments, the surface modification may be treatment with an organic compound. In other such embodiments, the surface modification may be the application of a layer disposed on the electrode.

In embodiments where a layer is disposed on an electrode in one of the first and second regions, the layer may substantially change the electron transfer from the second electrode to the electro-optic medium. In some embodiments, the layer may be an n-type semiconductor layer doped with an electron acceptor element. In other embodiments, the layer may be a p-type semiconductor layer doped with an electron acceptor element. In some embodiments, the layer may be disposed in the second region and the second region may accordingly have a diodic behavior at electrical potentials of the first magnitude.

In some embodiments, the surface modification may be applied to the second electrode in a gradient. This application may be a variation in thickness or variation in coverage density or thickness of the surface modification. In some such embodiments, the gradient may correspond to or correlate with sheet resistance across the second electrode such that a substantially more uniform electrical potential may be achieved across the second electrode.

In some embodiments, the first and second electrodes may have different compositions within one of the first and second regions. In some such embodiments, the first and second electrodes may have substantially the same compositions within the other of the first and second regions.

In some embodiments, the apparatus may further comprise a sensor substantially optically aligned with the second region. In some such embodiments, the electrical potential of the first polarity and the first magnitude may be applied based, at least in part, on the sensor entering an activated state. In other such embodiments, the electrical potential of the first polarity and the first magnitude may be applied based, at least in part, on ambient lighting conditions. In yet other such embodiments, the sensor may be an imager operable to capture one or more images of a user. Further, a controller may be configured to analyze the one or more images and perform a biometric analysis of the user. Additionally, the second region may be substantially reflective such that the user may substantially optically align one or more of the user's eyes with the imager by positioning such that a reflection of the one or more eyes is observed by the user in the second region.

In accordance with another aspect of the present invention, an apparatus is disclosed. In some embodiments, the apparatus may be a rearview assembly. The apparatus may comprise an electro-optic element. The electro-optic element may comprise a first substate, a second substate, a first electrode, a second electrode, and an electro-optic medium. The first substrate may have a first surface and a second surface. The second substrate may have a third and a fourth surface. The second substrate may be disposed in a spaced apart relationship with the first substrate. The first electrode may be associated with the second surface. Similarly, The second electrode may be associated with the third surface. Further, the second electrode may have a first region and a second region. The electro-optic medium may be disposed between the first electrode and the second electrode. Additionally, the electro-optic medium may be operable between substantially activated and substantially un-activated states based, at least in part, on exposure to an electrical potential. Further, the electrodes may be operable to activate the electro-optic medium in configurations where the electro-optic medium is substantially activated in the first region and substantially un-activated in the second region. In some embodiments, the second region is surface treated. The surface treatment may be with a non-conductive material, such as $SiO_2$.

In some embodiments, the apparatus comprises a sensor. In some such embodiments, the sensor may be an imager. The sensor may be in optical alignment with the second region. Additionally, the second region may be substantially limited to a field of view of the sensor.

Some aspects of the present disclosure may have the advantage of an electro-optic element operable to be activated in one region while leaving another region un-activated. Accordingly, the electro-optic element may be a multi-region device. Further, in some embodiments, the electro-optic element may have the advantage of a multi-region device without the need for seals, barriers, or ablation lines to divide the regions. Therefore, the electro-optic element may provide for a more aesthetically pleasing appearance. Further, in some embodiments, the electro-optic element may further provide for a more aesthetically pleasing appearance in that the difference between the total light transmissiveness and/or color transmissiveness between the first region and the second region may be equal to or less than about 20, 10, or 5 percent when both regions are in activated and/or un-activated states Other aspects of the present disclosure may have the advantage of enabling an electro-optic element to be selectively activated to an operation state where a region of the electro-optic element is left un-activated, while other regions are activated. Leaving a region un-activated may have may advantages depending on application. For example, in embodiments wherein a region is optically aligned with a sensor, leaving the optically aligned region un-activated may have the advantage of better sensor performance. In some embodiments, an activated electro-optic element may reduce the transmittance of light therethrough. the reduced transmittance may be advantageous for reducing glare, however, reduced transmittance in the sensor's field of sensing may be detrimental to the sensor's sensing by reducing the amount of available light. Therefore, the electro-optic element may have the advantage of selectively maintaining high levels of transmittance in a region corresponding to the sensor's field of sensing (i.e., filed of view) while retaining benefits associated with an electro-optic element having reduced transmittance in other regions. In another example, in embodiments wherein a region is optically aligned between a sensor and a subject, a region may be disposed to provide the subject with active feedback, enabling the subject to better find suitable positioning relative sensor for performance of biometric analysis.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

DETAILED DESCRIPTION

For the purposes of description herein, the specific devices and processes illustrated in the attached drawings and described in this disclosure are simply exemplary embodiments of the inventive concepts defined in the appended claims. Hence, specific characteristics relating the embodiments disclosed herein are not limiting, unless the claims expressly state otherwise.

Some embodiments of the present disclosure are directed to improved electro-optic elements. These electro-optic elements may have multiple regions and may be operable to provide for independent region activation. Further, some such embodiments may have a region optically aligned with a sensor. Accordingly, some embodiments of the electro-optic elements may address the problems of reduced sensor performance and aesthetically un-pleasing multiple region appearances.

Figure 1A:
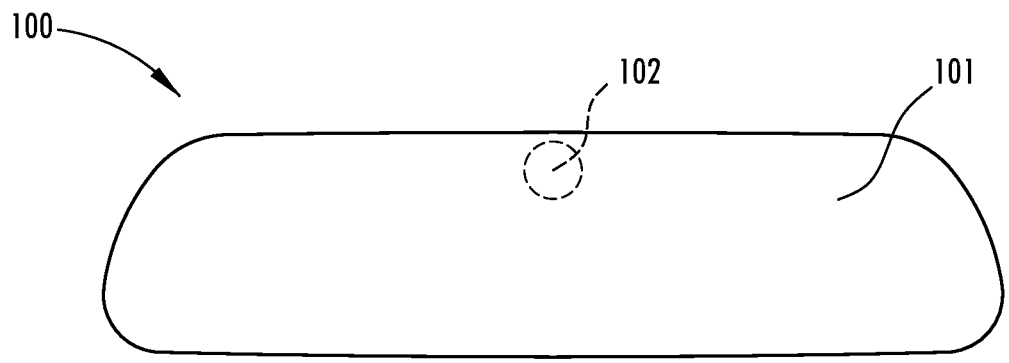
FIG. 1a: A schematic representation of an electro-optic element.
Figure 1B:
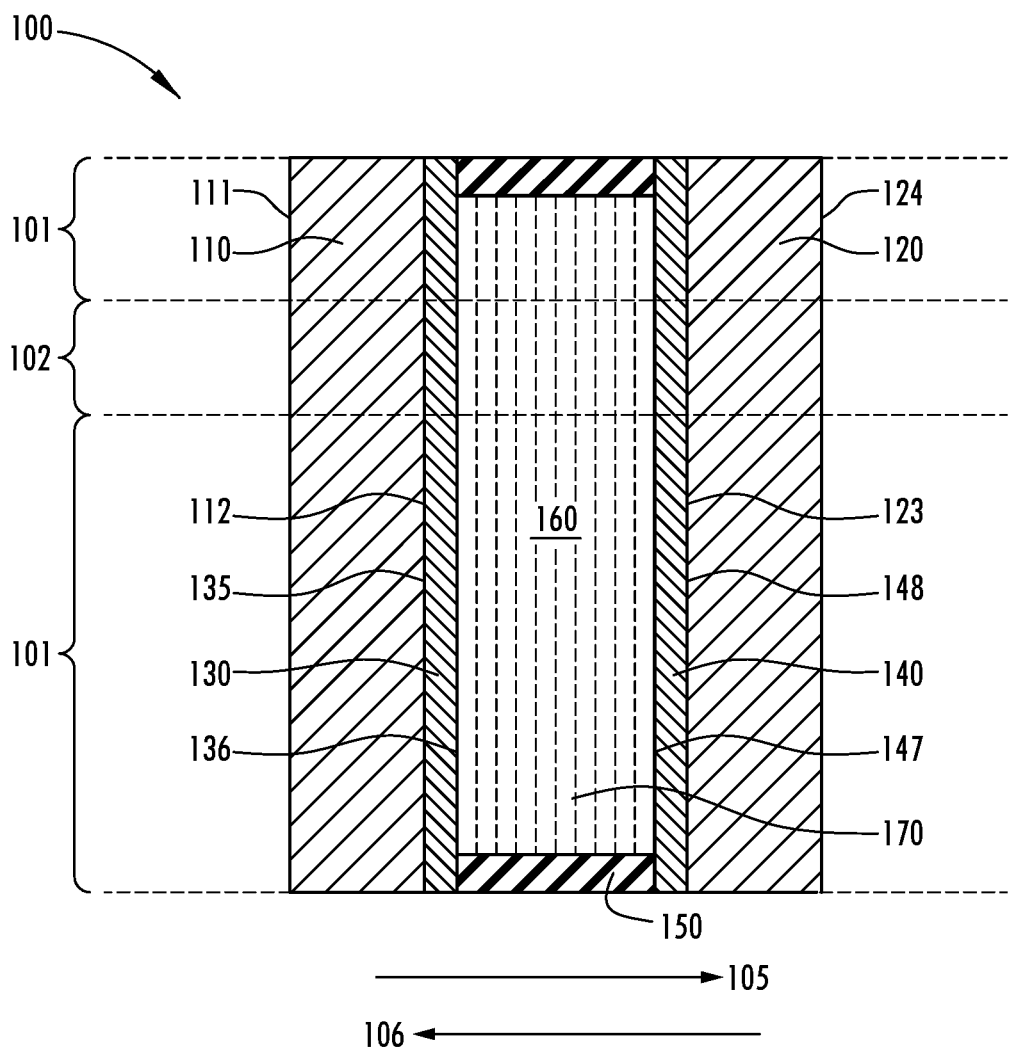
FIG. 1b: A cross-sectional schematic representation of an electro-optic element.

FIGS. 1a-b illustrate embodiments of an electro-optic element 100. Electro-optic element 100 has a first region 101 and a second region 102. In some embodiments, first region 101 and/or second region 102 may be discontinuous. Accordingly, first region 101 and/or second region 102 may comprise multiple unconnected areas. Further, electro-optic element 100 may comprise a first substrate 110, a second substrate 120, a first electrode 130, a second electrode 140, seal 150, a chamber 160, and/or an electro-optic medium 170. In some embodiments, electro-optic element 100 may be a rearview device for a vehicle. In other embodiments, electro-optic element 100 may be a window. In some such embodiments, the window may be for a vehicle such as for an aircraft or an automobile.

First substrate 110 comprises a first surface 111 and a second surface 112. In some embodiments, second surface 112 may be disposed in a first direction 105 relative first surface 111. First direction 105 may be a direction substantially orthogonal to first surface 111. Further, first substrate 110 may be substantially transparent in the visible region of the electromagnetic spectrum. For example, first substrate 110 may be fabricated from any of a number of materials, such as alumino-silicate glass, such as Falcon commercially available from AGC; boroaluminosilicate ("BAS") glass; polycarbonate, such as ProLens® polycarbonate, commercially available from Professional Plastics, which may be hard coated; polyethylene terephthalate, such as but not limited to Spallshield® CPET available from Kuraray®; soda lime glass, such as ultra-clear soda lime glass; float glass; natural and synthetic polymeric resins and plastics, such as polyethylene (e.g., low and/or high density), polyethylene terephthalate (PET), polyethylene naphthalate (PEN), polycarbonate (PC), polysulfone, acrylic polymers (e.g., poly(methyl methacrylate) (PMMA)), polymethacrylates, polyimides, polyamides (e.g., a cycloaliphatic diamine dodecanedioic acid polymer (i.e., Trogamid® CX7323)), epoxies, cyclic olefin polymers (COP) (e.g., Zeonor 1420R), cyclic olefin copolymers (COC) (e.g., Topas 6013S-04 or Mitsui Apel), polymethylpentene, cellulose ester based plastics (e.g., cellulose triacetate), transparent fluoropolymer, polyacrylonitrile; and/or combinations thereof. While particular substrate materials are disclosed, for illustrative purposes only, numerous other substrate materials may likewise be used.

Similarly, second substrate 120 comprises a third surface 123 and a fourth surface 124. Further, second substrate 120 is disposed in a substantially parallel and spaced apart relationship relative first substrate 110. In some embodiments, second substrate 120 may be disposed in the first direction 105 relative first substrate 110. Additionally, fourth surface 124 may be disposed in the first direction 105 relative third surface 123. Likewise, third surface 123 may be disposed in a second direction 106 relative fourth surface 124. The second direction 106 may be a direction opposite the first direction 105. In some embodiments, second substrate 120 may be substantially transparent in the visible region of the electromagnetic spectrum. Accordingly, second substrate 120 may be made from the same materials suitable for first substrate 110. In other embodiments, second substrate 120 may be substantially opaque in the visible region. In some such embodiments, second substrate 120 may be reflective and/or transflective or comprise a layer that is reflective and/or transflective in the visible region of the electromagnetic spectrum.

First electrode 130 may be associated with second surface 112. Further, first electrode 130 comprises a fifth surface 135 and a sixth surface 136. Sixth surface 136 may be disposed in the first direction 105 relative fifth surface 135. Accordingly, fifth surface 135 may be associated with second surface 136. Additionally, first electrode 130 is an electrically conductive material. The electrically conductive material may be substantially transparent in the visible region and generally resistant to corrosion from materials contained in chamber 160. For example, the electrically conductive material may be a transparent conductive oxide (TCO) such as fluorine doped tin oxide (FTO), indium tin oxide (ITO), aluminum doped zinc oxide (AZO), or indium zinc oxide (IZO).

Similarly, second electrode 140 may be associated with third surface 123. Further, second electrode 140 comprises a seventh surface 147 and an eighth surface 148. Seventh surface 147 may be disposed in the second direction 106 relative eighth surface 148. Thus, eighth surface 148 may be associated with third surface 123. Additionally, second electrode 140 may also be an electrically conductive material. Accordingly, second electrode may be constructed from the same materials as first electrode 130. In some embodiments, second electrode 140 may be substantially transparent in the visible region. In other embodiments, second electrode 140 may be substantially reflective and/or comprise a substantially reflective layer in the visible region. In some such embodiments, second electrode 140 may be substantially transflective and/or comprise a substantially transflective layer in the visible region.

Additionally, first electrode 130 and/or second electrode 140 may each be divided by first region 101 and second region 102 of electro-optic element 100. However, despite being divided into the first and second regions 101, 102, each of the first and/or second electrodes 130, 140 may be continuous and uninterrupted between these regions. In some embodiments, these regions of first electrode 130 and/or second electrode 140 are not separated by a seal, ablation line, or other method. Accordingly, regions of the first and/or second electrodes 130, 140 may be in electrical communication with one another. However, each of the first and/or second electrodes 130, 140 may individually be different at first region 101 and second region 102. Additionally, within a single region, in some embodiments, the first and second electrodes 130, 140 may have different compositions relative one another. Further, in some such embodiments, in the other region, the first and second electrodes 130, 140 may have compositions that are substantially the same or similar relative one another.

In some embodiments, with respect to an individual electrode, the first and/or second electrodes 130, 140 at first region 101 and second region 102 may each have different oxidation states and/or comprise different metal oxides. For example, the electrically conductive material of a respective electrode may be ITO at first region 101 and IZO at second region 102. In some such embodiments, a respective electrode may have a same or substantially similar construction as the other electrode within one region of the first and second regions 101, 102 and have a substantially different construction as the other electrode within the other region of the first and second regions 101, 102. An exemplary list of alternative materials for the electrode region different relative itself or the other electrode include NiO, IGZO (indium gallium zinc oxide), ZnOn, ZnIN, and CuI (copper iodide).

Figure 1C:
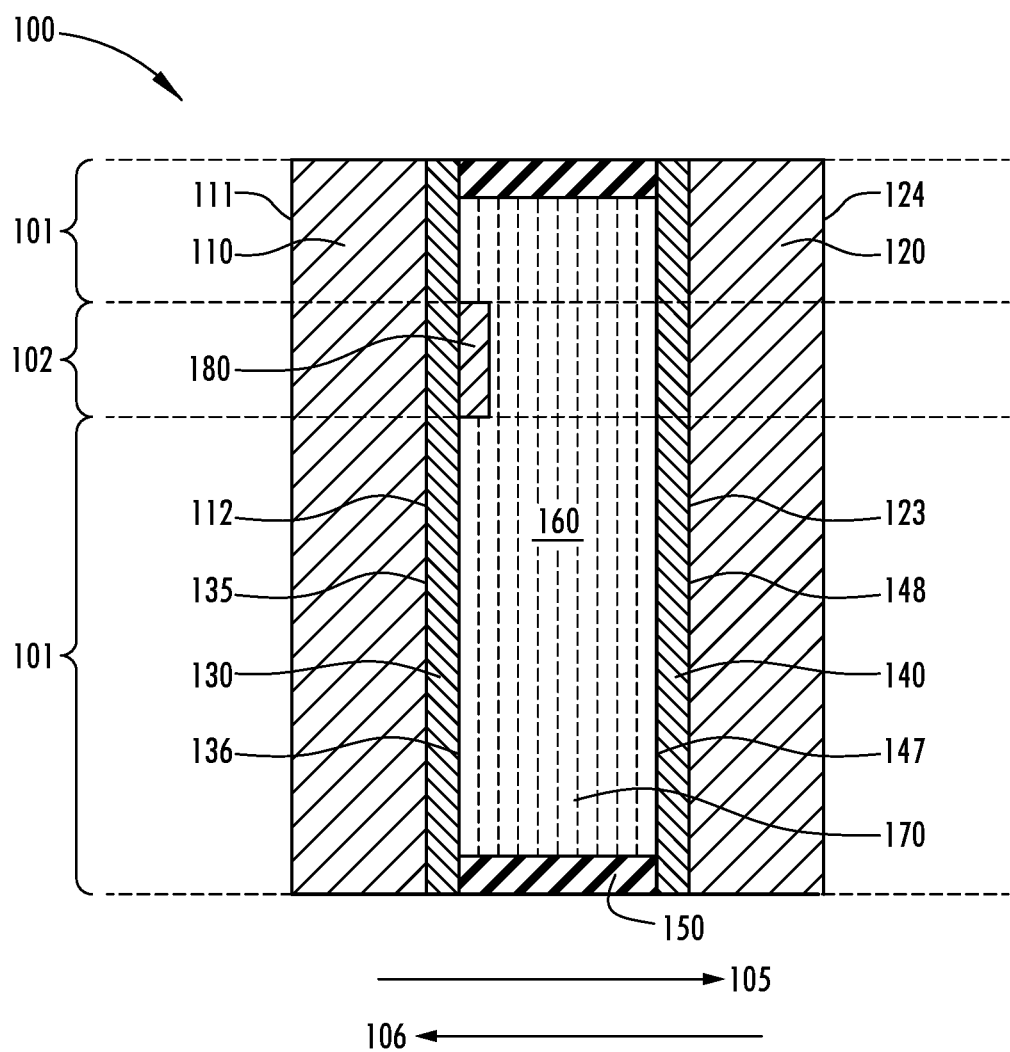
FIG. 1c: A cross-sectional schematic representation of an electro-optic element having an electrode with a surface modification.

Additionally or alternatively, as shown in FIG. 1c, with respect to an individual electrode, first region 101 and second region 102 may have different surface modifications. Surface modification may be achieved by disposing a layer 180 on a surface or treating a surface of the first and/or second electrode 130, 140 adjacent electro-optic medium 170 such that the surface modification enhances or diminishes electron transfer from the respective electrode to the electro-optic medium 170. The enhancement or diminishment of electron transfer may be characterized as a change in electron transfer affinity. Accordingly, sixth surface 136 and/or seventh surface 147 may be surface modified. In some embodiments, the layer 180 or treatment of the surface modification may be an organic compound. In other embodiments, the surface modification may be a TCO disposed as layer 180 on the electrically conductive material of the respective electrode where the electrically conductive material is a different TCO. For example, a layer of ITO may serve as the electrically conductive material of the respective electrode and a layer 180 or IZO may be disposed thereon adjacent chamber 160. Further, the surface modification may be a semiconductor layer, such as, for example, aluminum doped ZnO, intrinsically doped ZnO, ZnON (Zinc oxinitride), $ZrO_2$, or ZnS. Additionally, the semiconductor layer may be p-type or n-type. N-type semiconductors are doped with an electron donor element. This may cause Fermi levels to be closer to conduction bands of the material. Conversely, p-type semiconductors are doped with an electron acceptor element. This may cause Fermi levels to be further from conduction bands of the material. In other embodiments, first region 101 or second region 102 of an electrode may be surface modified with an electrode pacifier by disposing a layer 180 on or applying a treatment to the surface. The electrode pacifier may be a material operable to cause the first and/or second electrodes 130, 140 to be inoperable transfer electrons between the respective electrode and the electro-optic medium 170 in the area of the electrode pacifier. The inoperability to transfer electrons may be as a result of an electron transfer affinity of zero. Accordingly, the electrode pacifier may cause the first and/or second electrodes 130, 140 to be inoperable to activate electro-optic medium 170 in the respective region. The electrode pacifier, for example, may be treatment with $SiO_2$.

In some such embodiments, the surface modification may achieve a material pair for the electrode within the respective region. Such material pairs may provide a diodic effect. Exemplary material pairs include NiO/ZnO, NiO/ITO, IGZO/ITO, ZnON/ITO, and CuI/ZnO. Thus, variations of p/n (bipolar) or n/n+(homopolar) semiconductor type constructions may be suitable. For further example, the ITO may be replaced with other materials having similar or higher conductivities.

Additionally, although in FIG. 1c layer 180 is illustrated as disposed on top of and protruding from the surface of the electrode, in some embodiments, layer 180 may be optically flush with the surface of the electrode. In some such embodiments, an ion etch may be utilized at the desired location of layer 180 on the respective electrode to provide adequate room for layer 180.

Additionally, the surface modification may be applied in a variable manner across the first and/or second region 101, 102. In some embodiments, the variable application of the surface modification may be in a gradient fashion. Thus, in some such embodiments, layer 180 may have a varied thickness across the first and/or second region 101, 102. Such an embodiment may have the benefit of compensating for inherent potential drops across the first and/or second electrodes 130, 140. For example, an electrical current traveling through an un-surface modified electrode with a finite sheet resistance to an electro-optic medium 170 experiences an increasing resistance across the electrode at points further away from an electrical buss or contact. This increase in resistance may cause the electrical potential applied to electro-optic medium 170 at various points to vary, effectively applying a lower voltage at the electro-optic medium 170 at points further away from an electrical buss, and thus cause uneven electro-optic medium 170 activation for a single overall potential applied to the electrode via the contact or buss. Accordingly, applying the surface modification in a variable manner across the first and/or second region 101, 102 may compensate for the potential drop the electrode would otherwise experience. Thus, the surface modification may be variably applied in a manner that substantially corresponds to a potential drop across the first and/or second region 101, 102 of the otherwise un-surface modified first and/or second electrodes 130, 140, achieving a substantially more uniform electro-optic medium 170 activation across the first and/or second region 101, 102. Accordingly, the surface modification may have the effect of selectively creating a resistor and/or a diode that may be tuned by changing thickness or material.

As a first example, using an unmodified electro-optic element 100 with ITO first and second electrodes 120, 130 as reference, such an electro-optic element 100 may have difficulty activating electro-optic medium 170 at the center thereof, but may be able to more easily activate electro-optic medium 170 closer to the busbars. Accordingly, electro-optic medium 170 may be activated to different degrees between these two areas. In this example, electro-optic medium 170 may require about 1.2V to activate but exposing electro-optic medium 170 to a voltage higher than about 1.2V may result in irreversible damage. This effect of non-uniform activation is product of the loss in voltage applied to electro-optic medium 170 due to the finite electrode resistance.

As a second example, and in contrast to the first example, by using an electro-optic element 100 having ITO electrodes surface modified with a layer of ZnO with graded thickness, this effect may be minimized, and activation uniformity may be improved. The ITO/ZnO modified layer may functions as a diode, where when operated as a cathode it may have insignificant resistance and when operated as anode the resistance may be controlled by the thickness of the ZnO layer. Such layer of ZnO on ITO may locally and precisely increase the resistance to electro-optic medium 170 by approximately 0.23 V for each nm of thickness of applied ZnO layer when the applied voltage to the ITO/ZnO electrode is operated as anode. The thickness of the ZnO may be lowest or non-existing at the point furthest away from the busbars, therefore not adding any further resistance at that point. The thickness of the ZnO may gradually increase until reaching a maximum thickness in the close vicinity of the corresponding surface busbar. Thus the thickness of the ZnO may gradually increase until reaching a value of about 8.7 nm in close proximity to the busbars, which corresponds to a voltage drop of (8.7 nm)*(0.23 V/nm)=2 V. As such, the thickness of the surface modification may decrease with increasing distance from the bus bar or contact. In this case, when electro-optic element 100 is operated at 3.2 V at the busbars with the surface modified electrode as anode, the ITO/ZnO electrode is able to effectively deliver 1.2 V at electro-optic medium 170 substantially uniformly across the surface near and far of the busbars while preventing an overvoltage to be applied, thus creating a more uniform, reversible, and pleasant activation of electro-optic medium 170.

Seal 150 is disposed in a peripheral manner to define a chamber 160 in combination with one or more of second surface 112, third surface 123, first electrode 130, and second electrode 140. Alternatively, seal 150 may be disposed about and extending between peripheries of the first and second substrates 110, 120. Further, seal 150 may comprise any material capable of being adhesively bonded to one or more of to in turn seal chamber 160, such that an electro-optic medium 170 does not inadvertently leak out of chamber 160.

Electro-optic medium 170 is disposed in chamber 160. In some embodiments, the electro-optic medium 170 may comprise anodic and cathodic compound species. Further, electro-optic medium 170 is operable to enter an activated state during exposure to an electrical current having a particular potential. In some embodiments, electro-optic medium 170 may be an electrochromic medium. Accordingly, in an activated state, electro-optic medium 170 may be operable to exhibit a change, relative an un-activated state, in its extinction coefficient at one or more wavelengths in the electromagnetic spectrum. Additionally, the change in extinction coefficient may occur in the visible region of the electromagnetic spectrum. In some embodiments, electro-optic medium 170 may be further operable to return to an un-activated state during an absence of an electrical current.

In operation, first electrode 130 and second electrode 140 may operate together to apply an electrical potential across the electro-optic medium 170 disposed therebetween. The electrical potential accordingly may cause an electrical current to flow through the electro-optic medium 170. The electrical current may have a first polarity or a second polarity (i.e. positive or negative current). Additionally, the first and second polarities are opposite one another. Further, the electrical current of the first polarity may also have a first electrical potential. Similarly, the electrical current of the second polarity may also have a second electrical potential. In some embodiments, the first and second electrical potentials may have first and second magnitudes, respectively. The first magnitude may be substantially greater than, equal to, or less than the second magnitude. For example, the first magnitude may be approximately 1.2 volts and the second magnitude may be approximately 3.2 volts, or vice versa.

In some embodiments, the first polarity may correspond to a current traveling from first electrode 130 to second electrode 140. In such an embodiment, first electrode 130 may be a surface modified electrode. Further, first electrode 130 may be a cathode and second electrode 140 may be an anode. Conversely, in such an embodiment, the second polarity may correspond to a current traveling from second electrode 140 to first electrode 130. Thus, the first electrode 130 may become an anode and second electrode 140 may become a cathode. In such embodiments, where electro-optic medium 170 has anodic and cathodic compounds, electrons may be removed from the anodic compounds at the anodic electrode, thus oxidizing it, and electrons may be injected into the cathodic compounds at the cathodic electrode, thus reducing it. Further, an electrical circuit may shuttle electrons from the anodic electrode to the cathodic electrode.

In embodiments where, with respect to an individual electrode, the electrode is different at the first and second regions 101, 102 by way of different oxidation states, metal oxide composition, and/or surface modification other than a by an electrode pacifier, electro-optic element 100 may be variably activated by way of three or more operation states. In some such embodiments, in one region, the first and second electrodes 130, 140 may have the same or substantially similar compositions, while in the other region, the first and second electrodes 130, 140 may have substantially different compositions. The three operation states may include first, second, and third operation states. In some embodiments, the degree to which electro-optic medium 170 is activated within a state may be variable in response to the magnitude of the electrical potential.

In the first operation state, no electrical potential is applied by the first and second electrodes 130, 140. Accordingly, no electrical current flows through electro-optic medium 170. Therefore, electro-optic medium 170 may remain in or enter a substantially un-activated state in both first region 101 and second region 102.

In the second operation state, a first electrical potential of the first polarity is applied by the first and second electrodes 130, 140. Accordingly, an electrical current of a first direction may flow though electro-optic medium 170. Further, the first electrical potential may have a first magnitude. The first magnitude may be sufficient to cause substantial activation of the electro-optic medium 170 in one region, but not in the other. Therefore, electro-optic medium 170 may remain in or enter a substantially activated state in one region of the first and second regions 101, 102 and remain in or enter a substantially un-activated state in the other region of the first and second regions 101, 102. In some embodiments, the first polarity may correspond to a current flowing from the electrode differentiated between regions to a substantially uniform electrode. The differences of the electrode by region may result in different electron transfer affinities from the electrode to electro-optic medium 170 by region. Thus, the surface modification may cause the electrical potential supplied to the first and second electrodes 130, 140, via the contacts or buss, that is needed to create a sufficient electrical potential and electrical current across the electrodes within the respective region in order to substantially activate electro-optic medium 170 to substantially shift up or down. As a consequence, the current flow of the first electrical potential at the first magnitude may be substantially directed to the region with a greater electron transfer affinity, thereby selectively activating the electro-optic medium 170 in that region.

In the third operation state, a second electrical potential of the second polarity is applied by the first and second electrodes 130, 140. Accordingly, an electrical current of a second direction may flow through electro-optic medium 170. Further, the second electrical potential may have a second magnitude. The second magnitude may be sufficient to substantially activate electro-optic medium 170. In some embodiments, the second magnitude may be substantially equal to the first magnitude. Therefore, in this operation state, electro-optic medium 170 may remain in or enter a substantially activated state in both first region 101 and second region 102. In some embodiments, the second polarity may correspond to a current flowing from a substantially uniform electrode to an electrode differentiated by region. The substantially uniform electrode may be substantially uniform with respect to electron transfer affinity from the electrode to the electro-optic medium 170. As a consequence, the current flow from the electrode may be substantially dispersed across the entirety of the substantially uniform electrode. Thus, the surface modification may service as a diode. Therefore, electro-optic medium 170 may be activated across the entire chamber 160 (i.e. across both the first and second regions 101, 102).

The region of the first and second regions 101, 102 that undergoes activation of the electro-optic medium 170 under an electrical potential of a first polarity but not of a second polarity may be said to be a diodic region. In some embodiments, this diodic region may correspond to a region where the first and second electrodes 130, 140 are different relative one another within the region. For example, the first and second electrodes 130, 140 may be different relative one another, within the region, by way of different oxidation states, comprising different metal oxides, one electrode having a surface modification substantially different that of the composition of the other electrode, and/or each electrode having substantially different surface modifications. In some such embodiments, the surface modification may create a diodic electrode surface.

Alternatively, in embodiments where first electrode 130 and/or second electrode 140 are modified by an electrode pacifying layer 180 of or treatment, electro-optic element 100 may be variably activated having two operation states. The two operation states may include fourth and fifth operation states.

In the fourth operation state, no electrical potential is applied by the first and second electrodes 130, 140. Accordingly, no electrical current flows through electro-optic medium 170. Therefore, electro-optic medium 170 may remain in or enter an un-activated or substantially un-activated state in both first region 101 and second region 102.

In the fifth operation state, an electrical potential of any polarity may be applied by the first and second electrodes 130, 140. Accordingly, an electrical current may flow through electro-optic medium 170. Further, electro-optic medium 170 may remain in or enter a substantially un-activated state in the region modified with the electrode pacifier and remain in or enter a substantially activated state in the region not modified by the electrode pacifier. The electrode pacifier may serve to substantially increase the resistance in the respective region and therefore divert current flow to the other region with substantially reduced resistance. By rendering the electrode inoperable to transfer electrons between the respective electrode and electro-optic medium 170, the electrode pacifier may cause electro-optic element 100 to be inoperable to activate electro-optic medium 170 in that region.

Figure 2:
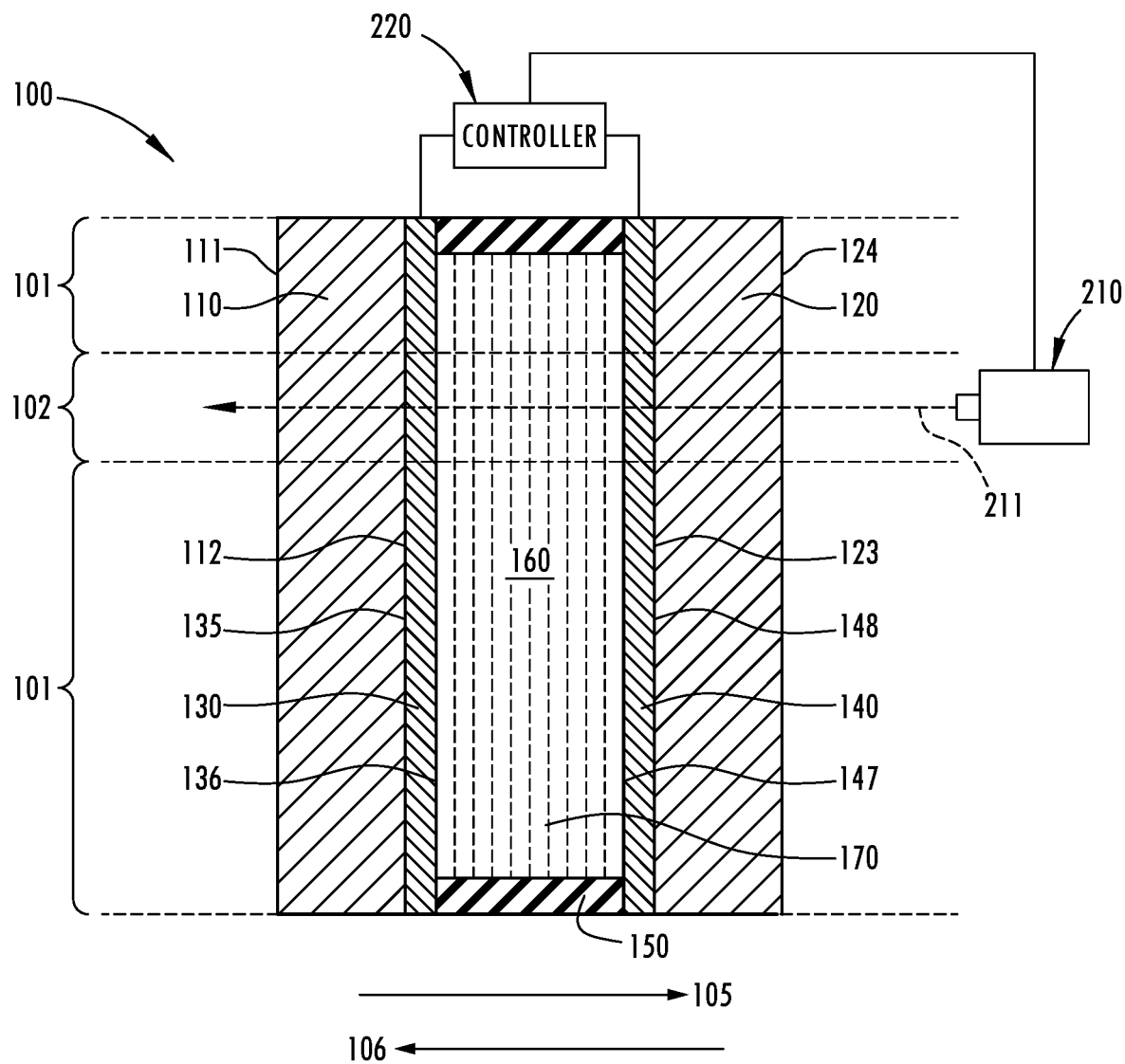
FIG. 2: A cross-sectional schematic representation of a system comprising an electro-optic element.

Some embodiments of electro-optic element 100 may have the advantage of being operable to be activated in one region while leaving another region un-activated. Accordingly, the electro-optic element 100 may be a multi-region device. Further, some embodiments of electro-optic element 100 have the advantage of a multi-region device without the need for seals, barriers, or ablation lines to divide the regions 101, 102. Therefore, electro-optic element 100 may provide for a more aesthetically pleasing appearance. Further, some embodiments of electro-optic element 100 may further provide for a more aesthetically pleasing appearance in that the difference between the total light transmissiveness and/or color transmissiveness between first region 101 and second region 102 may be equal to or less than about 20, 10, or 5 percent when both regions are in activated and/or un-activated states Additionally, as shown in FIG. 2, electro-optic element 100 may be a part of a system or assembly further comprising a sensor 210 and a controller 220. In some embodiments, the assembly may be a rearview assembly or a window assembly.

Sensor 210 may be any device operable to detect a condition. Further, sensor 210 may be an optical sensor. Accordingly, sensor 210 may have an optical axis 211. By way of example, sensor 210, may be an ambient light sensor or an imager. Additionally, sensor 210 may be disposed in the first or second direction 105, 106 relative electro-optic element 100. In some embodiments, sensor 210 may have an optical axis 211 and/or field of sensing (i.e., field of view) which bisects electro-optic element 100. In some further embodiments, sensor 210 may have an optical axis 211 and/or field of sensing which bisects and/or is substantially limited to a first or second region 101, 102.

Controller 220 is electrically connected to first electrode 130 and second electrode 140. In some embodiments, controller 220 may be communicatively connected to sensor 210. Further, controller 220 may comprise a memory and a processor. The memory may be operable to store an ambient lighting algorithm and/or a biometric analysis algorithm. An ambient lighting algorithm may be operable to receive ambient lighting level measurements in at least one direction and determine a likelihood of glare light being reflected from electro-optic element 100. Further, based, at least in part, on the likelihood being over a threshold, ambient lighting algorithm may be operable to cause first electrode 130 and second electrode 140 to apply an electrical potential of the first or second polarity. The biometric analysis algorithm may be operable to receive data from sensor 210 and perform a biometric authentication operation or a driver awareness monitoring operation. In some embodiments, the biometric analysis algorithm may be operable to cause first electrode 130 and second electrode 140 to apply an electrical potential of the first or second polarity based, at least in part, on sensor 210 entering an activated state wherein sensor 210 may collect data. In some such embodiments, the biometric analysis algorithm may be further operable to cause first electrode 130 and second electrode 140 to apply an opposite electrical potential based, at least in part, on sensor 210 entering an un-activated state. The processor may be operable to execute the ambient lighting algorithm and/or the biometric analysis algorithm.

Accordingly, some embodiments may have the advantage of enabling an electro-optic element 100 to be selectively activated including an operation state where a region of electro-optic element 100 is left un-activated. Leaving a region un-activated may have may advantages depending on application. For example, in embodiments wherein a region is optically aligned with sensor 210, leaving the optically aligned region un-activated may have the advantage of better sensor 210 performance. In some embodiments, an activated electro-optic element 100 may reduce the transmittance of light therethrough. The reduced transmittance may be advantageous for reducing glare, however, reduced transmittance in the sensor's 210 field of sensing may be detrimental to the sensor's 210 sensing by reducing the amount of available light. Therefore, electro-optic element 100 has the advantage of selectively maintaining high levels of transmittance in a region corresponding to the sensor's 210 field of sensing while retaining benefits associated with an electro-optic element 100 having reduced transmittance in other regions.

Figure 3A:
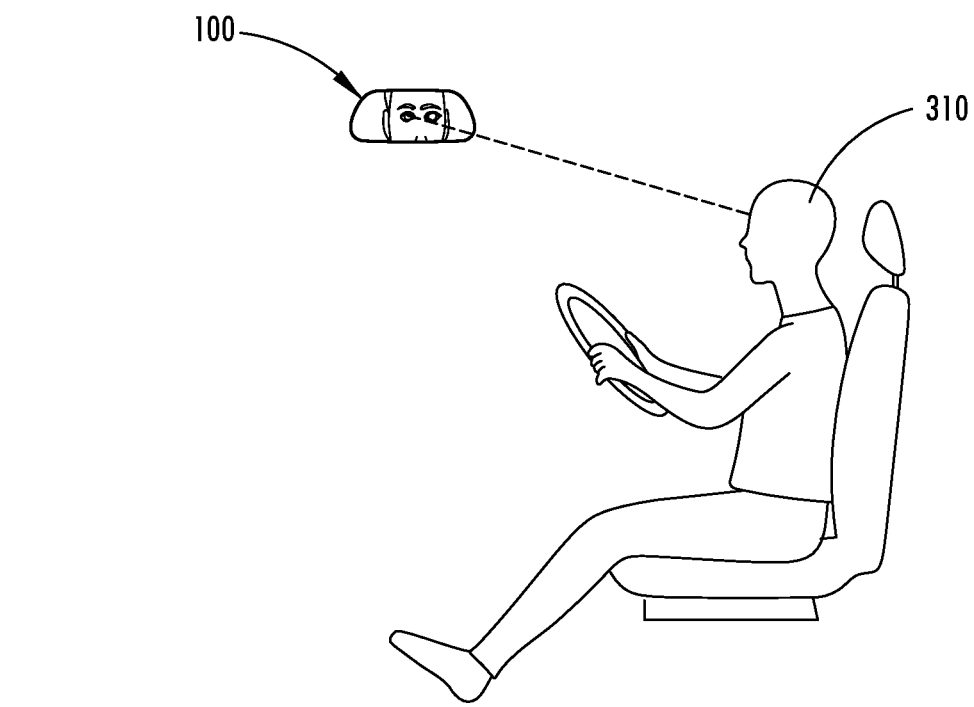
FIG. 3a: A schematic representation of an electro-optic element configured for providing enhanced alignment between a sensor and a subject.
Figure 3B:
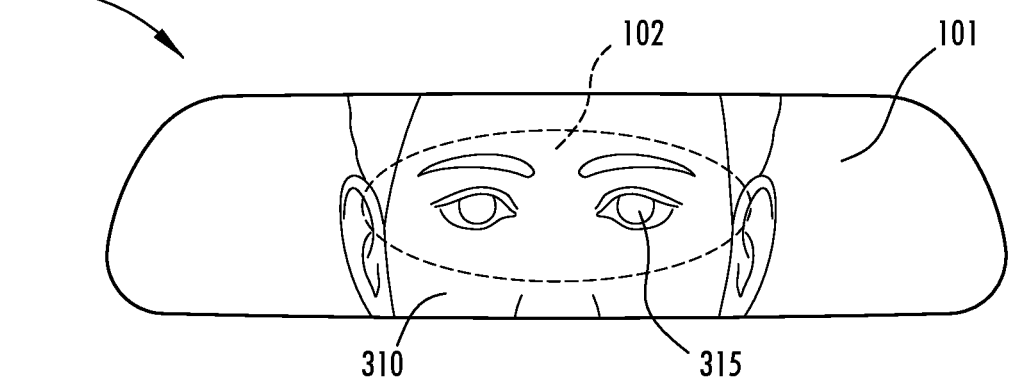
FIG. 3b: A schematic representation of an electro-optic element configured for providing enhanced alignment between a sensor and a subject.

As shown in FIGS. 3a-b, electro-optic element 100 may be part of a variably transmissive rearview mirror. In some embodiments, the rearview mirror may be an interior rearview mirror, a driver's side exterior rearview mirror, or a passenger's side exterior rearview mirror disposed on a vehicle. The rearview mirror may be operable to provide a subject 310 with a field of view rearward and/or to the side respective the vehicle. Further, in some embodiments where electro-optic element 100 is a part of a system and/or assembly further comprising a sensor 210 and a controller 220 operable to execute the biometric analysis algorithm, electro-optic element 100 may be configured to enhance user alignment with sensor 210. For example, sensor 210 may need to sense the subject's 310 eyes 315. Accordingly, second region 102 may be disposed such that when subject 310 can see a reflection of his/her eyes 315, the eyes 315 are suitably disposed in the sensor's 210 field of sensing. Therefore, based, at least in part, on sensor 210 entering an activated state wherein sensor 210 may collect data related to eyes 315, first region 101 may be activated into a state of low transmittance and second region 102 may be un-activated into a state of high transmittance. Thus, subject 310 may re-position eyes 315 such that they are viewed in the high transmittance region allowing for suitable alignment with sensor 210.

Accordingly, some embodiments may have the advantage of enabling an electro-optic element 100 that may be selectively activated with an operation state where a region of electro-optic element 100 is left un-activated. Leaving a region 101, 102 un-activated may have may advantages depending on application. For example, in embodiments wherein a region 101, 102 is optically aligned between sensor 210 and a subject 310, a region 101, 102 may be disposed to provide subject 310 with active feedback enabling subject 310 to better find suitable positioning relative sensor 210 for performance of biometric analysis.

Figure 4:
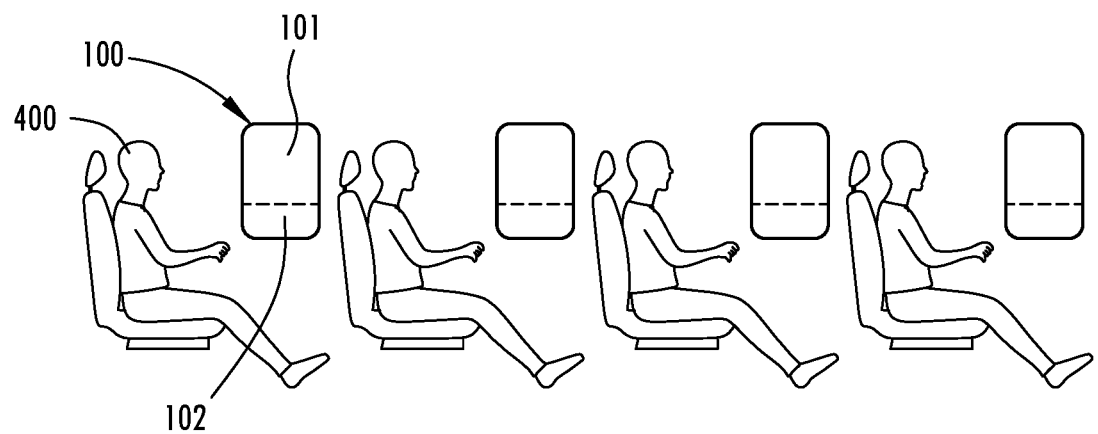
FIG. 4: A schematic representation of an electro-optic element as a part of a window assembly.

As shown in FIG. 4, electro-optic element 100 may be part of a window assembly. In some embodiments, the window assembly may be disposed in a vehicle, such as an airplane or an automobile. The window assembly may be operable to provide a passenger 400 with a variably transmissive field of view external the vehicle. First region 101 and second region 102 may both be activated to provide passenger 400 with shade from light outside the vehicle. Likewise, first region 101 and second region 102 may both be un-activated to provide passenger 400 with light and/or an un-diminished field of view. Further, electro-optic element 100 may advantageously be activated such that one region 101, 102 is active and the other region 101, 102, respectively, is un-activated. Such an operation state has the advantage of reducing the total amount of light entering the vehicle while allowing for undiminished light in a selective region 101, 102. Passenger 400 may find this operation state preferable for providing light for an activity such as reading while minimizing glare from a light source onto their face or minimizing light which may disturb others.

Embodiments of the electro-optic elements 100 described above having a first or second region 101, 102 that is only activated during the application of an electrical potential of only one of the polarities may be said as having a diodic behavior. In other words, this region may act as a diode. This diodic behavior is significant. Prior electro-optic elements utilized a pair of electrodes disposed on either side of an electro-optic medium, such as an electrochromic medium. However, these prior elements activated the electro-optic medium across the entirety of the electrodes to which an electrical potential was applied, regardless of the polarity of the electrical current. These prior elements relied solely on the magnitude of the applied potential to control degree of electro-optic medium activation. Accordingly, two potentials having the same magnitude, but different polarities would both cause equal activation of the electro-optic medium. The diodic behavior of embodiments of the present electro-optic elements 100 allows regions to be polarity selective.

One explanation for the diodic behavior of some embodiments of the present electro-optic element 100 may be based on interfacial work function modification. This modification specifically affects the transfer of electrons from the respective electrode to the electro-optic medium 170 during operation. When the electrode is surface modified, bonds at the surface thereof may be broken and new bonds may be formed that change the characteristics of the surface. These changes may result in differing physical properties, or the formation of an interfacial electric field which alters the surface's work function. For example, when an ITO electrode is surface modified by treatment with oxygen plasma, bonds at the surface of the ITO may be broken, allowing for the formation of —OH bonds at the ITO surface. The formation of these hydroxyl groups at the surface may cause an effective increase in the work function. Additionally, other bonds may be formed to achieve similar affects.

Additionally or alternatively to the work function modification, another explanation for the diodic behavior of some embodiments of the present electro-optic element 100 may be based on the formation of a Schottky barrier. The Schottky barrier may be at the underlying electrode material, such as the ITO, and surface modification interface; at the surface modification and electro-optic medium 170 interface; or a combination thereof.

In the case of the barrier being at the underlying electrode material and surface modification interface, the barrier may be formed due to the difference in work functions between the between these two entities. Specifically, a metal or highly degenerate semiconductor material forming the underlying electrode may be placed in immediate contact with a n-type semiconductor with a lower work function or a p-type semiconductor with a larger work function, forming the surface modification. For example, ITO serves as a metallic-like degenerate material and ZnO serves as an n-type semiconductor. The presence of this barrier may introduce an artificial interfacial depletion region in the surface modification. The depletion region may accordingly be responsible for the relatively small, applied voltages to the electrode encountering large resistances when powered in one polarity. However, under an extreme bias of this polarity, the depletion layer may break down.

In the case of the barrier being at the surface modification and electro-optic medium 170 interface, the diode behavior may arise from energy level differences between these two materials. Where one electrode of the electro-optic element 100 is surface modified within a diodic region and the other electrode is not surface modified within the diodic region, this may be demonstrated. An illustration of an example of this affect may be seen in FIGS. 5a-d. FIGS. 5a-d are schematic representations illustrating semiconductor band models of an embodiment of electro-optic element 100. A surface modified electrode is shown to the left of the vertical axes and a normal electrode that has not undergone surface modification is shown to the right of the axes. For example, the surface modified electrode may be surface modified with ZnO and the normal electrode may be an ITO. The vertical axes collate to electron energy and their placements mark horizontal spatial relationship of the interfaces between the electro-optic medium 170 and the respective electrode. In other words, the vertical axes are horizontally aligned with the electrode and electro-optic medium 170 interfaces. Accordingly, the horizontal axis is an arbitrary position coordinate across the electro-optic element 100, relative the interfaces between the electrodes and the electro-optic medium 170 and is not to scale. Thus, as horizontal distance from either of the vertical axes increases, physical separation to the interface between the electrode and the electro-optic medium 170 increases. $E_{CB}$ corresponds to a minimum energy of the conduction band. The conduction band is the lowest level of unoccupied electronic states at 0 K. $E_F$ corresponds to the Fermi level. The Fermi level is the energy where the probability of finding an electron is ½ at 0 K. While the illustrations in FIGS. 5a-d may correspond to many electro-optic element 100 configurations, these illustrations were constructed based on a configuration where the surface treatment may be or result in a non-degenerate n-type semiconductor. Specifically, a surface treatment of ZnO on ITO is illustrated. Further, the non-surface treated electrode, shown to the right, is ITO.

Figure 5A:
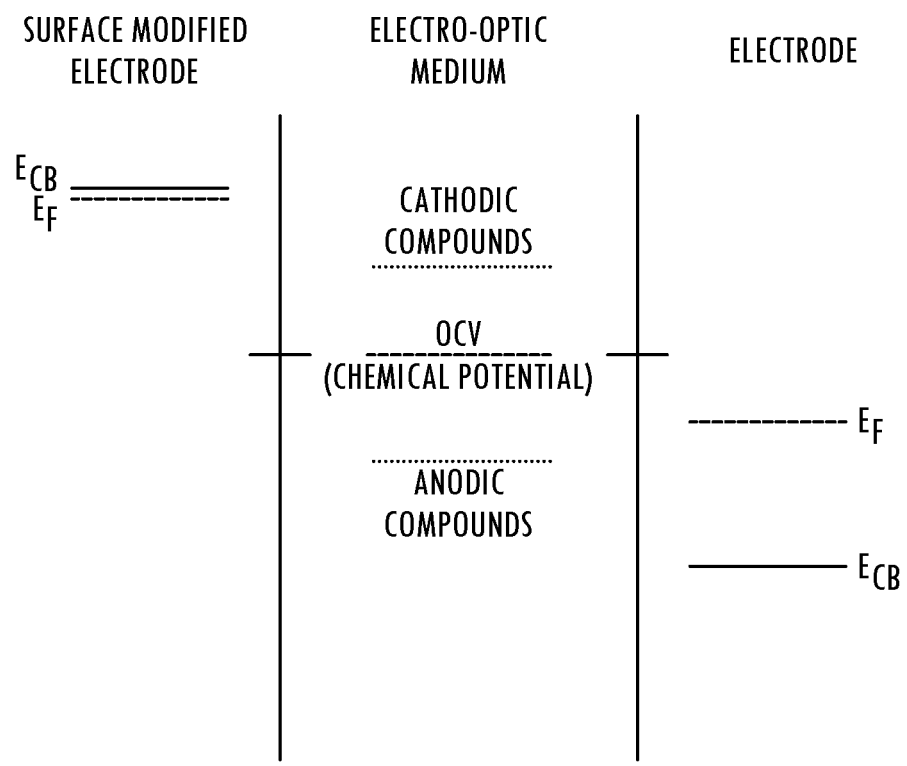
FIG. 5a: A schematic representation of a semiconductor band model of an embodiment of an electro-optic element prior to equilibration or the application of an electrical potential.
Figure 5B:
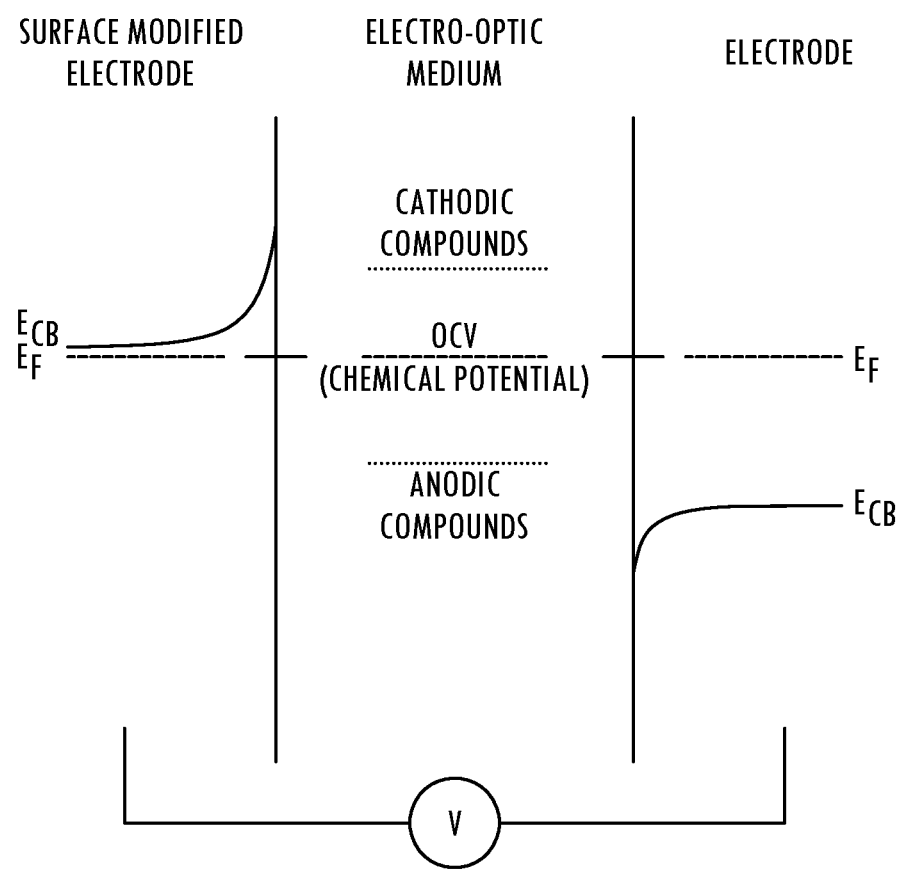
FIG. 5b: A schematic representation of a semiconductor band model of an embodiment of an electro-optic element with an open circuit.
Figure 5C:
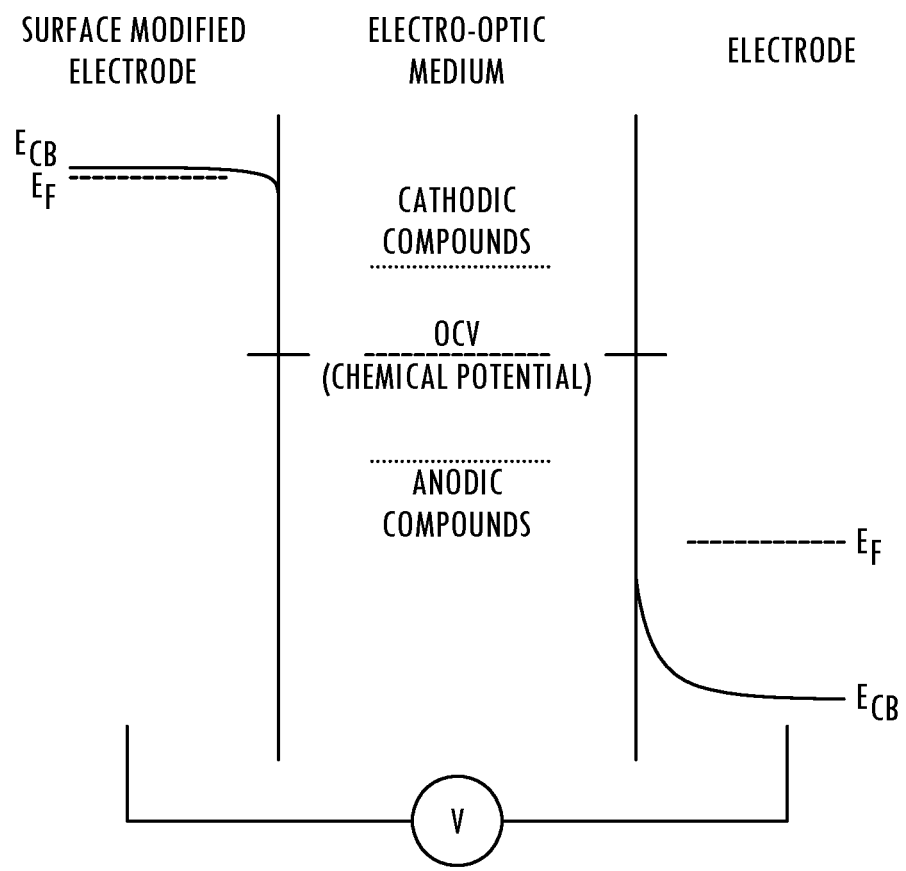
FIG. 5c: A schematic representation of a semiconductor band model of an embodiment of an electro-optic element with an electrical potential of a first polarity.
Figure 5D:
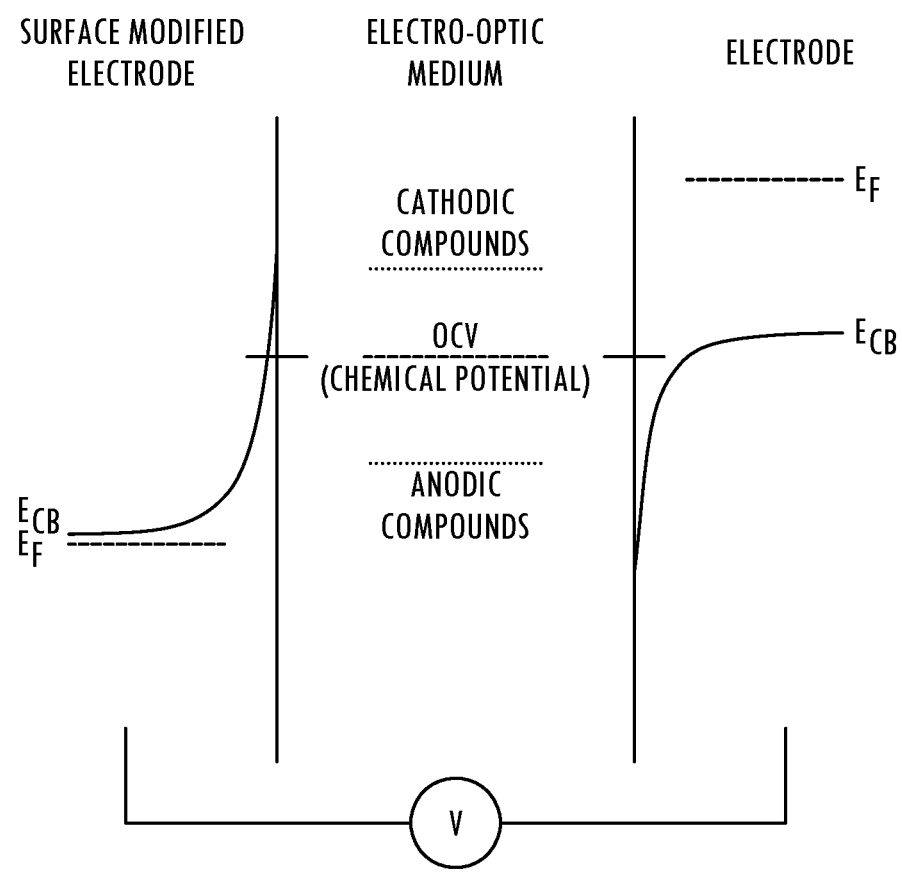
FIG. 5d: A schematic representation of a semiconductor band model of an embodiment of an electro-optic element with an electrical potential of a second polarity.

FIG. 5a illustrates a band model of the energy levels of the bulk semiconductor in the absence of any interfacial effects or applied voltages. FIG. 5b illustrates a band model when electro-optic element 100 has an open circuit and there is no substantial electrical potential applied thereto. When the semiconductor is placed in contact with another material, an equilibrium may occur across the interface resulting in built-in voltage on both sides and equilibration of the Fermi levels. Due to the density of the states, more change is generally observed within the semiconductor. This built-in voltage may result in depletion or accumulation layers at the interfaces. Accordingly, voltages applied to the system are with respect to this equilibrated system and shift Fermi levels and/or condition bands up and/or down. FIG. 5c illustrates a band model when electro-optic element 100 has an electrical potential of a first polarity. The first polarity may correspond to an electrical current flowing through an external electrical circuit from the electrode on the left to the electrode on the right. FIG. 5d illustrates a band model when electro-optic element 100 has an electrical potential of a second polarity. The second polarity may correspond to an electrical current flowing from the electrode on the right to the electrode on the left. Thus, the second polarity is opposite in sign relative the first polarity. Further, this potential of the second polarity may be equal in magnitude to the potential of the first polarity. Therefore, the first polarity may correspond to when the resistance of the diodic region is low and the second polarity may correspond to when the resistance or Schottky barrier is high.

The normal ITO electrode may behave energetically as a metal due to its degeneracy at all potentials applied to the electro-optic medium 170 during normal operation—normal operation may correspond to potentials below what would be required to change the behavior to a non-degenerate one. This may be due, at least in part, to a high level of doping. As shown on the right of FIGS. 5a-d, the degenerate behavior is demonstrated as the Fermi level remains at a higher energy than the interfacial conduction band edge regardless of applied electrical potential. The surface modified electrode, however, as a substantially non-degenerate semiconductor, experiences appreciable band bending at the surface modification and electro-optic medium 170 interface. This may result in the formation of a space charge region. Under the application of an electrical potential of a first polarity, as shown in FIG. 5c, cathodic species may be easily reduced at the surface modification and electro-optic medium 170 interface due to a slight interfacial accumulation layer and no energy barrier. Conversely, under application of an electrical potential of a second polarity but equal magnitude, as shown in FIG. 5d, a large interfacial depletion layer is formed. Thus, injection of electrons from the anodic compound into the interface with the modified electrode is hindered by this large surface barrier. However, under relative extreme magnitude of the electrical potential of the second polarity, the barrier may become thin and electrons may tunnel through it allowing an anodic current flow.

Therefore, the diode effect for a region may be created by pairing an ITO electrode with an electrode composed of a semiconductor with conduction band and Fermi level energies higher than the anodic compound's chemical potential. Such a scenario ensures that in the absence of surface states or valence band interaction, all electrical potentials of sufficient magnitude to oxidize the anodic material create a surface energy barrier at the electro-optic medium 170 interface.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

In this document, relational terms, such as "first," "second," and the like, are used solely to distinguish one entity or action from another entity or action, without necessarily requiring or implying any actual such relationship or order between such entities or actions.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

The term "transparent" is applied in the relative sense. "Transparent" refers to an optical element or material that is substantially transmissive of at wavelengths in question and thus generally allows light at such wavelengths to pass therethrough. The wavelengths in question will vary based on the context. However, in the event the wavelengths in question is not readily apparent, the wavelengths in question shall generally refer to visible light.

The term "opaque" is applied in the relative sense. "Opaque" refers to an optical element or material that is not appreciably transparent or translucent at wavelengths in question and thus generally does not allow light at such wavelengths to pass therethrough. The wavelengths in question will vary based on the context. However, in the event the wavelengths in question is not readily apparent, the wavelengths in question shall generally refer to visible light.

The term "transflective" generally refers to an optical configuration that reflects at least a portion of light incident from at least one side and transmits at least a portion of light incident from at least one side. In particular, "transflective" describes an optical element or component that has a non-zero level of transmittance with regard to a wave range of light and also has a non-zero level of reflectance in a region. The applicable wave range of light will vary based on the context. However, in the event the relevant wave range of light is not readily apparent, the wave range in light shall generally refer to visible light.

It is to be understood that although several embodiments are described in the present disclosure, numerous variations, alterations, transformations, and modifications may be understood by one skilled in the art, and the present disclo-

What is claimed is:

1. An apparatus comprising:
an electro-optic element having a first region and a second region, the electro-optic element comprising:
a first substrate having a first surface and a second surface;
a second substrate having a third surface and a fourth surface, the second substrate disposed in a spaced apart relationship with the first substrate;
a first electrode associated with the second surface;
a second electrode associated with the third surface; and
an electro-optic medium disposed between the first electrode and the second electrode, the electro-optic medium operable between substantially activated and substantially un-activated states based, at least in part, on to exposure to an electrical potential;
wherein the electro-optic medium is:
substantially activated in the first region and substantially un-activated in the second region when the electrical potential is of a first magnitude and a first polarity; and
substantially activated in the first region and in the second region when the electrical potential is of the first magnitude and a second polarity, the second polarity opposite the first polarity.

2. The apparatus of claim 1, wherein the first and second regions of each of the first and second electrodes are each continuous and uninterrupted between each other.

3. The apparatus of claim 1, wherein the first and second regions for each of the first and second electrodes are each in electrical communication with each other.

4. The apparatus of claim 1, wherein the second electrode has different oxidation states in the first and the second regions.

5. The apparatus of claim 1, wherein the second electrode comprises different metal oxides in the first and the second regions.

6. The apparatus of claim 1, wherein the second electrode is surface modified within one of the first and second regions.

7. The apparatus of claim 6, wherein the second electrode is surface modified via a treatment with an organic compound.

8. The apparatus of claim 1, wherein a layer is disposed on the second electrode in one of the first and second regions.

9. The apparatus of claim 8, wherein the layer substantially changes the electron transfer from the second electrode to the electro-optic medium.

10. The apparatus of claim 8, wherein the layer is an n-type semiconductor layer doped with an electron donor element.

11. The apparatus of claim 8, wherein the layer is a p-type semiconductor layer doped with an electron acceptor element.

12. The apparatus of claim 8, wherein the layer is disposed in the second region and the second region has diodic behavior at electrical potentials of the first magnitude.

13. The apparatus of claim 1, wherein a surface modification is applied to the second electrode in a gradient.

14. The apparatus of claim 13, wherein the gradient correlates with resistance across the second electrode such that a substantially more uniform electrical potential may be achieved across the second electrode.

15. The apparatus of claim 1, wherein within in one of the first and second regions, the first and second electrodes have different compositions.

16. The apparatus of claim 15, wherein within in the other of the first and second regions, the first and second electrodes have substantially the same compositions.

17. The apparatus of claim 1, further comprising a sensor substantially optically aligned with the second region.

18. The apparatus of claim 17, wherein the electrical potential of the first polarity and the first magnitude is applied based, at least in part, on the sensor entering an activated state.

19. The apparatus of claim 17, wherein:
the sensor is an imager operable to capture one or more images of a user;
a controller is configured to analyze the one or more images and perform a biometric analysis of the user;
the second region is substantially reflective such that the user may substantially optically align one or more of the user's eyes with the imager by positioning such that a reflection of the one or more eyes is observed by the user in the second region.

20. The apparatus of claim 17, wherein the electrical potential of the first polarity and the first magnitude is applied based, at least in part, on ambient lighting conditions.

* * * * *